Patented Nov. 19, 1929

1,735,976

UNITED STATES PATENT OFFICE

OTTO RIEMANN, OF WELLINGSBUTTEL, NEAR HAMBURG, GERMANY

PROCESS FOR THE PRODUCTION OF STARCH FROM SWEET POTATOES

No Drawing.   Application filed August 24, 1928.   Serial No. 301,854.

The present invention relates to the production of starch from sweet potatoes. To undergo the process for the production of starch, the sweet potatoes are first of all washed in order to perfectly clean them. Subsequently they are peeled or skinned by means of suitable peeling machines, if their nature requires peeling off the skin to prevent discolouring of the starch to be produced therefrom. The peeled sweet potatoes are washed to render them perfectly clean.

According to their size the sweet potatoes previously washed and skinned, if skinning is necessary, are divided in two or more parts to facilitate their disintegration or reduction to small particles by means of a rasp of the power driven kind usually employed for that purpose. The thus reduced sweet potatoes, the mash, are subjected to strong pressure in suitable presses in order to separate therefrom the sugar-containing juices.

The resulting mass of the pressed out sweet potatoes with a suitable addition of fresh water is conveyed to a washing apparatus, which separates therefrom the starch in a liquid state called starch milk. This starch milk is treated for the production of dry starch by sedimentation and washing as usual.

The sugar-containing juices previously separated from the reduced sweet potatoes by pressure are treated to separate and gain therefrom the starch particles by sedimentation.

What I do claim as my invention and desire to secure by Letters Patent is:

1. Process for the production of starch from sweet potatoes consisting in washing and disintegrating the sweet potatoes, in separating by pressure the sugar-containing juices from the reduced sweet potatoes, in washing the pressed out mass so as to separate therefrom the starch in a liquid state and in treating the liquid starch for the production of dry starch by sedimentation.

2. Process for the production of starch from sweet potatoes consisting in washing and disintegrating the sweet potatoes, in separating by pressure the sugar-containing juices from the reduced sweet potatoes, in washing the pressed out mass so as to separate therefrom the starch in a liquid state, in washing the sugar-containing juices previously separated from the reduced sweet potatoes by pressure so as to separate and gain therefrom the starch particles by sedimentation and in treating the liquid starch for the production of dry starch by sedimentation.

3. Process for the production of starch from sweet potatoes consisting in washing, peeling, again washing and disintegrating the sweet potatoes, in separating by pressure the sugar-containing juices from the reduced sweet potatoes, in washing the pressed out mass so as to separate therefrom the starch in a liquid state and in treating the liquid starch for the production of dry starch by sedimentation.

In witness whereof I have hereunto signed my name this 9th day of August, 1928.

OTTO RIEMANN.